United States Patent
Guo et al.

(10) Patent No.: US 8,422,409 B2
(45) Date of Patent: Apr. 16, 2013

(54) SYSTEM AND METHOD OF DUPLEX WIRELESS AUDIO LINK OVER BROADCAST CHANNELS

(75) Inventors: Hangwei Guo, Beijing (CN); Yifeng Zhang, San Jose, CA (US); Peiqi Xuan, Saratoga, CA (US)

(73) Assignee: Quintic Holdings, Santa Clara, CA (US)

( * ) Notice: Subject to any disclaimer, the term of this patent is extended or adjusted under 35 U.S.C. 154(b) by 317 days.

(21) Appl. No.: 12/895,143

(22) Filed: Sep. 30, 2010

(65) Prior Publication Data

US 2012/0082067 A1    Apr. 5, 2012

(51) Int. Cl.
*H04B 7/005* (2006.01)
*H04B 1/44* (2006.01)
*H04W 4/00* (2009.01)
*H04J 3/02* (2006.01)

(52) U.S. Cl.
USPC ........... 370/278; 370/282; 370/329; 370/462; 455/426.1

(58) Field of Classification Search .......... 370/272–302, 370/315, 319–322, 328–330, 332, 343, 348, 370/445–463; 455/426.1, 454, 464–466, 455/550.1–555
See application file for complete search history.

(56) References Cited

U.S. PATENT DOCUMENTS

| | | | |
|---|---|---|---|
| 7,720,029 B2 * | 5/2010 | Orava et al. | 370/329 |
| 2009/0270047 A1 * | 10/2009 | Heijnen | 455/77 |
| 2009/0310786 A1 * | 12/2009 | Zhang et al. | 380/270 |
| 2009/0310803 A1 | 12/2009 | Zhang | |
| 2009/0311973 A1 | 12/2009 | Zhang | |
| 2009/0311982 A1 | 12/2009 | Zhang | |

* cited by examiner

*Primary Examiner* — Tri H Phan
(74) *Attorney, Agent, or Firm* — Blairtech Solution LLC

(57) ABSTRACT

A device and method of duplex audio communication over a broadcast channel are disclosed. Low-power transmission over a broadcast channel is permissible for personal use as long as the transmitted power level is below a level allowed by respective regulatory. For example, low-power FM transmitter can be used to provide a wireless audio link between two audio devices. One such application scenario is a wireless speakerphone used as an audio extension from a cellphone for group conference purposes. Such applications face issues of potential interference from other users of the same channel and the need of manually selecting and tuning a pair of channels. The device and method disclosed in the present invention use the clear channel technique to automatically select an un-occupied channel for the transmit side and utilizes an identification embedded in a sub-channel to allow the receiver to automatically tune to the channel used by the transmitter. The clear channels may be determined by respective transceivers or determined by a master transceiver.

14 Claims, 9 Drawing Sheets

SYSTEM AND METHOD OF DUPLEX WIRELESS AUDIO LINK OVER BROADCAST CHANNELS

CROSS REFERENCE TO RELATED APPLICATIONS

This application is related to U.S. Non-Provisional patent application Ser. No. 12/137,535, entitled "Frequency Modulation (FM) Clear Channel Scanning System and Method of Using Same", filed on Jun. 11, 2008, U.S. Non-Provisional patent application Ser. No. 12/172,147, entitled "Channel Coordination between a Wireless Earphone and a Transmitter," filed Jul. 11, 2008, U.S. Non-Provisional patent application Ser. No. 12/473,281, entitled "Radio Transmitter and Radio Receiver with Channel Condition Assessment", filed May 28, 2009, and U.S. Non-Provisional patent application Ser. No. 12/495,796, entitled "Systems for Channel Coordination of Audio and Data Transmission in a Broadcast Band", filed on Jun. 30, 2009. These U.S. Patent Applications are hereby incorporated by reference in their entireties.

FIELD OF THE INVENTION

The present invention relates to wireless audio communication systems. In particular, the present invention relates to duplex wireless audio communication systems that utilize an auxiliary channel to automatically tune to an available channel within a radio band.

BACKGROUND

Low-power frequency modulation (FM) transmission in the FM broadcast channels is a permissible application in many countries for personal use as long as the transmitted power is in compliance with local regulatory standards. On the other hand, cellphones have been widely used almost in all regions around the world. In U.S. patent application Ser. No. 12/137,535, a system and method are disclosed to allow a transmitter to automatically select a clear radio channel that is not occupied by others so as to achieve the best possible transmission quality. In U.S. patent application Ser. No. 12/495,796, a system and method are disclosed which allow an audio link automatically established between an audio transmitter and an audio receiver. The system and method disclosed in U.S. patent application Ser. No. 12/495,796 rely on the clear channel technique disclosed in U.S. patent application Ser. No. 12/137,535 and a handshaking technique to establish the audio link automatically. Wireless earphones are one such application based on the invention of U.S. patent application Ser. No. 12/495,796, where the transmitter may be coupled to a cellphone or a portable media player to allow the audio heard on a matched wireless earphone.

The wireless earphone application can be further extended to allow two-way audio communication between two devices. In other words, the earphone becomes a speakerphone or a hand-free headset which not only receives audio but also provides audio using a microphone. The speakerphone comprises a speaker to deliver amplified audio transmitted from a portable device such as a cellphone or multimedia player, and a microphone to pick up the sound at the remote side and to relay it to the portable device. A speakerphone according to the above description will be useful for group conference call. For applications in a large group conference call, the remote speakerphone may use multiple microphones to pick up sound from multiple conference participants. The wireless speakerphone is also an ideal application for hand-free cellphone operation during driving a vehicle, where the wireless speakerphone can be mounted on the visor or a place close to the mouth of the driver and the wireless speakerphone communicates with the cellphone through the wireless audio link. Therefore, the driver can have conversation through the cellphone without holding the cellphone close to his ear/mouth. The wireless speakerphone can be based on the low-power FM technology which is mature and readily available worldwide. Such duplex audio link will be very useful and desirable for various wireless audio applications. However, there are broadcasters using assigned channels which are not suitable to use these channels for low-power transmission for personal use. Also, there may be channels being used by other nearby which may cause interference if such channels are used. Furthermore, it is desirable to have an easy to use speakerphone system that can automatically coordinate channel selection and tuning.

SUMMARY OF THE INVENTION

Methods and devices for duplex audio communication over broadcast channels are disclosed. In an embodiment of the present invention, a method of coordinating tuning between a first transceiver and a second transceiver for duplex audio communication is disclosed. The method comprising: determining a first radio channel in a radio band; transmitting a first control message at the first radio channel using the first transceiver; determining a second radio channel in the radio band; transmitting a second control message at the second radio channel using the second transceiver; searching for a second ID in the second control message over channels within the radio band to identify the second radio channel using the first transceiver; and searching for a first ID in the first control message over channels within the radio band to identify the first radio channel using the second transceiver. After the first radio channel and the second radio channel are established, the method further comprises receiving second audio from the second transceiver at the second radio channel using the first transceiver and receiving first audio from the first transceiver at the first radio channel using the second transceiver.

In yet another embodiment according to the present invention, a method of coordinating tuning is disclosed where a transceiver is designated as a master and is used to determine a first radio channel and a second radio channel. The first transceiver transmits identification information in a first message at the first radio channel for the slave transceiver to identify the first radio channel. Furthermore, the first transceiver provides information regarding the second radio channel in a second message so that the second transceiver can determine the second radio channel A method of coordinating tuning for a transceiver is also disclosed. In an embodiment of the present invention, the method comprises determining a transmit radio channel in a radio band; transmitting a transmit control message at the transmit radio channel using the transceiver; searching for an ID in a receive control message over channels within the radio band to identify a receive radio channel using the transceiver; and receiving audio from a remote transceiver at the receive radio channel using the transceiver.

A wireless duplex audio device is also disclosed. According to one embodiment of the present invention, the device comprises a transmitter to transmit first audio and a first control message at a first radio channel in a radio band, wherein the first control message comprises identification associated with the transmitter; a receiver to receive second audio and a second control message at a second radio channel in the radio band; and a controller, wherein the controller includes a clear channel scan unit to determine the first radio channel; and wherein the controller includes a channel search unit to determine the second radio channel.

DETAILED DESCRIPTION OF THE INVENTION

As described previously, it is possible to take advantage of low-power transmission in the broadcast band for personal wireless use. However, if a channel is randomly selected for transmission, the channel may be occupied by a broadcaster or another user. A technique, named Clear Channel Scan (CCS) is disclosed in U.S. Non-Provisional patent application Ser. No. 12/137,535, wherein the CCS technique allows a best un-occupied channel to be identified quickly. Therefore, a transmitter can use the CCS to identify an un-occupied channel and uses the identified channel to transmit audio and data. A receiver can be tuned to the identified channel to receive audio and data, and play the audio. To automate the channel tuning for the receiver, a handshaking method is disclosed in U.S. Non-Provisional patent application Ser. No. 12/172,147, which utilizes a sub-channel to transmit an identification code in the data channel so that the receiver can search for the channel that contains the pre-specified identification code. The handshaking technique has been applied to wireless earphone for auto-pairing so that a correct channel can be always identified adaptively. The U.S. Non-Provisional patent application Ser. No. 12/495,796 further extends the use of control message in the sub-channel for control of a remote receiver, such as channel switching. While a clear channel may be selected using the CCS technique, the channel quality may vary from time to time due to various reasons. When the channel quality degrades, the system should be able to detect the situation and react accordingly, such as determining and switching to a new clear channel.

In the present invention, a duplex air audio is disclosed which utilizes low-power transmission allowed for certain broadcast bands to achieve two-way audio communication between two devices. One such application is wireless speakerphone extension for cellphone for group voice conference or hand-free operation.

Figure 1A:
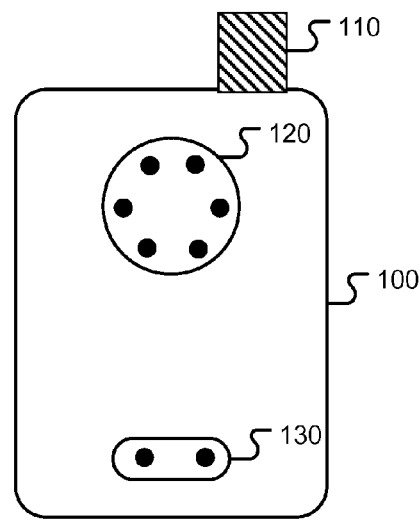
FIG. 1A shows a conventional cellphone with an embedded microphone and a speaker.

To overcome the limitations in the prior art described above, and to overcome other limitations that will become apparent upon reading and understanding the present specification, an embodiment of the present invention discloses a wireless speakerphone system to include a pair of transceivers to establish a 2-way audio link between a portable device and a remote speakerphone. The wireless audio link may be based on the existing FM broadcast bands which are widely available worldwide. The pair of transceivers can be a pair of FM transceiver that transmit and receive audio in the main channel and transmit and receive data in the sub-channel. The sub-channel can be based on the radio data system (RDS or RDBS) adopted for North America. Other radio data standards are also used in other regions of the world and the present invention is not limited to any particular implementation of the radio data standard transmitted in the sub-channel. FIG. 1A shows a conventional cellphone 100 with an embedded microphone 130 and a speaker 120. The antenna 110 is used by the cellphone to transmit and receive cellular signal to and from a base station.

Figure 1B:
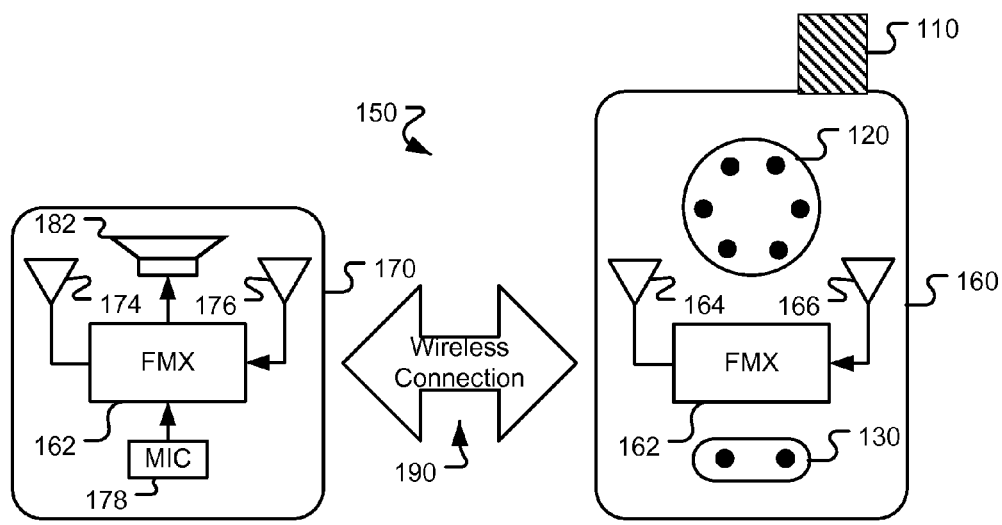
FIG. 1B illustrates an application scenario where a pair of FM transceivers is used to form a wireless audio link between a cellphone and a speakerphone.

FIG. 1B illustrates an application scenario where a pair of FM transceivers 162 is used to form a wireless audio link 190 between a cellphone 160 and a speakerphone device 170. The wireless speakerphone can be made using very compact wearable design so that it can be placed over the ear or mounted on the visor of a vehicle for hand-free operation of the cellphone. For group conference applications, a speaker suited for an intended group size may be used to deliver sufficient sound volume for the group conference and the wireless speakerphone can be designed accordingly to tailor the intended application. The wireless speakerphone for the group conference application can be powered by batteries or external power. On the cellphone side, the wireless speakerphone-capable cellphone 160 comprises an FM transceiver 162, a transmit antenna 164 and a receive antenna 166. While the transceiver 162 illustrated is for FM broadcast band, any other bands permitted by a respective regulatory for low-power transmission in a region may be used to practice the current invention. Two separate antennas 164 and 166 are used for illustration. However, it is possible to use a single antenna for both transmit and receive purposes to practice the present invention if the transmitted signal can be properly isolated from the received signal, such as sufficient channel separation between the transmit channel and the receive channel. Due to the limited space in the cellphone, miniature antennas or other antenna configuration, such as printed-circuit-board (PCB) antenna, may have to be used.

At the wireless speakerphone side, the device comprises an FM transceiver 162, a transmit antenna 174 and a receive antenna 176. Two separate antennas 174 and 176 are used for illustration and, again the two antennas may be replaced with a single antenna. A microphone 178 is used to pick up voice at the remote side near the device and multiple microphones may be needed to accommodate a large group conference. A speaker 182 is used to provide sound with adequate volume for group conference. As is well known in the art that a microphone requires suitable audio input interface circuit to match the impedance, to amplify the signal to a proper level, and to convert the analog signal to a digital signal for subsequent processing. The interface circuit may be external to, embedded in, or partially embedded in the transceiver 162. In either case, the present invention can be practiced. As is also well known in the art that the speaker requires a proper audio output interface circuit to convert digital audio into analog audio, and to amplify the signal to a level adequate to drive the speaker. Again, the audio output interface circuit may be external to, embedded in, or partially embedded in the transceiver 162. In either case, the present invention can be practiced. Furthermore, the speaker output to the microphone input may create an unintended audio feedback loop that will cause echo. The wireless speakerphone device may comprise an optional echo cancellation unit, which is not shown in FIG. 1B, to eliminate or reduce potential echo path from the speaker 182 to the microphone 178.

Figure 2A:
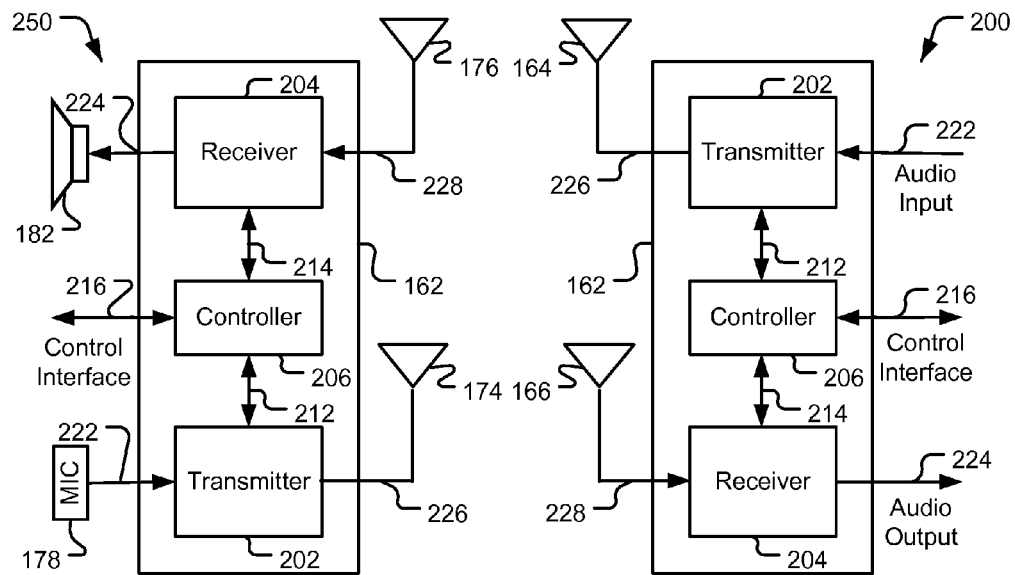
FIG. 2A illustrates a system block diagram of an exemplary duplex air audio system according to one embodiment of the present invention.

FIG. 2A illustrates a system block diagram of an exemplary duplex air audio system according to one embodiment of the present invention. The sub-system 200 on the right hand side of FIG. 2A represents the block diagram for the cellphone side where the audio input 222 to the transceiver 162 corresponds to the audio signal received from the cellular network. The sub-system 200 comprises a transmitter 202, a receiver 204 and a controller 206. The controller 206 interfaces with the transmitter 202 through interface 212 and interfaces with the receiver 204 through interface 214. Furthermore, the controller 206 may also interface with an external device, such as an external controller or pushbuttons and/or switches, through interface 216. The audio input 222 to the transceiver 162 would be routed to the speaker 120 in a conventional cellphone 100, and is now transmitted over the wireless audio link to the remote transceiver 162 and routed to the speaker 182. The audio output 224 from the transceiver 162 corresponds to the sounds picked up by the microphone 178 at the remote sub-system 250. The audio output 224 from the transceiver would be provided by the microphone 130 in the conventional cellphone 100. The transceiver 162 is coupled with the transmit antenna 164 through interface 226 and the receive antenna 166 through interface 228.

The sub-system 250 on the left side of FIG. 2A represents the device on the remote side. The sub-system 250 is substantially the same as the sub-system 200 except that the audio output 224 from the receiver 204 is coupled to the speaker 182 and the audio input 222 for the transmitter 202 is provided by the microphone 178. The transmit antenna 174 and the receive antenna 176 may be implemented differently from those in the sub-system 200 since the form factor for the remote sub-system may be very different from the cellphone 160. An antenna may even be extended to outside of the wireless speakerphone for group conference use, which may not be as objectionable as it would be for the cellphone side. The system as shown in FIG. 2A provides wireless connection for audio and control data between two devices and the technique is termed "air audio" in this disclosure.

Figure 2B:
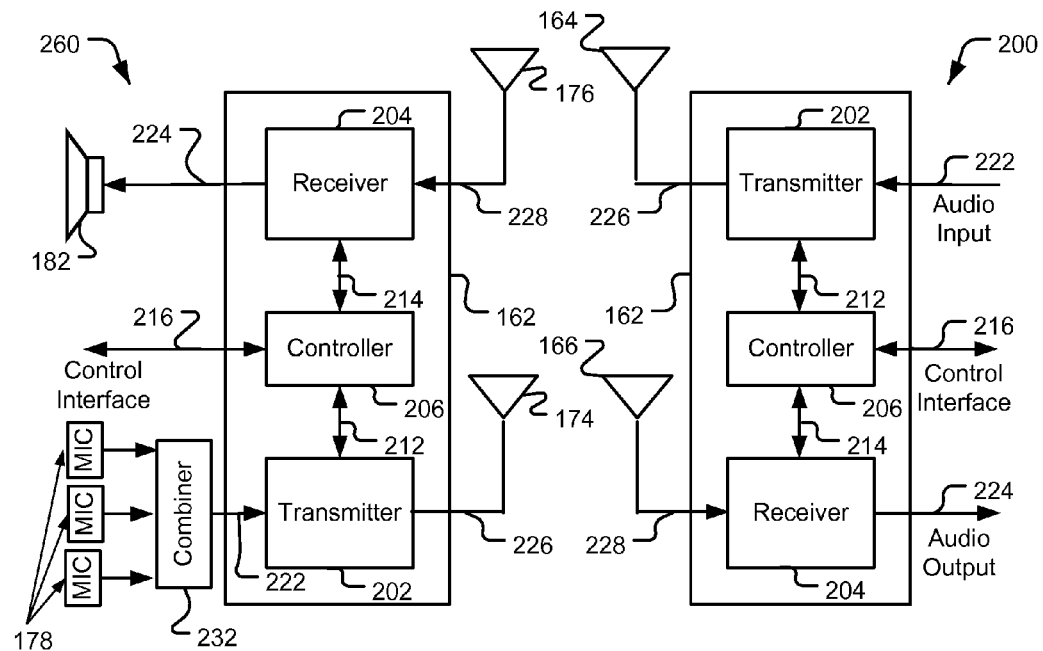
FIG. 2B illustrates a system block diagram of an alternative duplex air audio system according to one embodiment of the present invention.

FIG. 2B illustrates a system block diagram of an alternative duplex air audio system according to one embodiment of the present invention. For group conference with more participants, a single microphone may not be adequate to pick up voices properly from all participants. Therefore, it may be necessary to use multiple microphones to accommodate a large group of participants. The sub-system 260 with multiple microphones is shown in FIG. 2B. The inputs from multiple microphones may be combined by a combiner 232 and then fed to the transmitter 202 as shown in FIG. 2B. One configuration of multiple microphones for the speakerphone device is to place the combiner 232 inside housing for the transceiver and to provide connectors on the housing so that the microphones can be connected to the connectors on the housing of the speakerphone through wires.

Figure 3A:
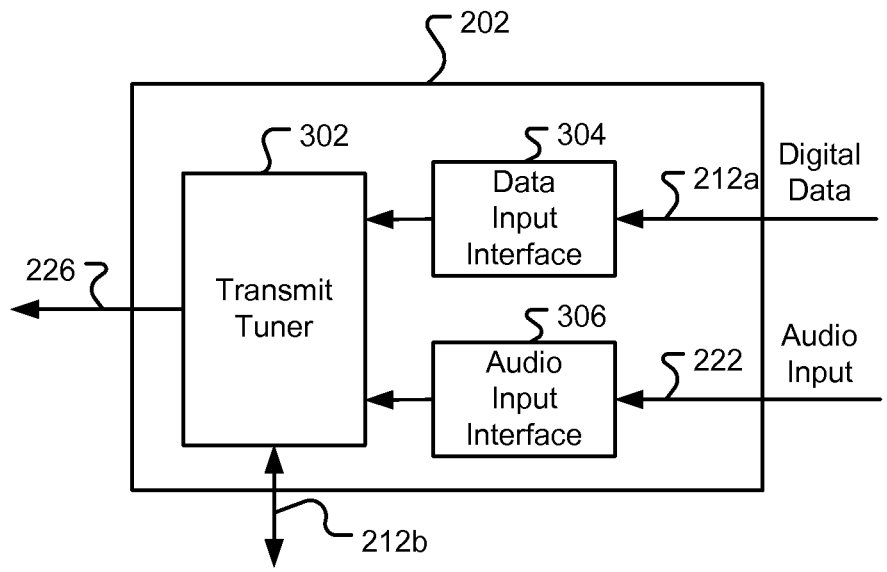
FIG. 3A illustrates a block diagram of an exemplary transmitter for the duplex air audio system.

FIG. 3A illustrates a block diagram of an exemplary transmitter 202 for the duplex air audio system. The transmitter 202 comprises a transmit tuner 302, an audio input interface 306, and a data input interface 304, where the audio input interface 306 provides the audio signal to be transmitted in the main channel and the data input interface 304 provides the digital data to be transmitted in the sub-channel of the channel selected at the transmit tuner 302. The transmit tuner 302 is responsible for multiplexing the input audio if it is a stereo signal, modulating the multiplexed audio and data, up-converting the modulated signal to a frequency corresponding to a selected channel, and amplifying the up-converted transmit signal. The amplified signal is coupled to an antenna through the interface 226. In the transmit path, signals at various stages may be subject to filtering to avoid interference and confine the transmitted signal within an allocated spectrum. The transmit tuner 302 interfaces with the controller 206 through interface 212b, which is a part of the interface 212. The controller 206 controls various operations of the transmit tuner, such as the transmit channel selection and filter parameters. The data input interface 304 receives digital data to be transmitted at the sub-channel from interface 212a, which is also a part of the interface 212.

Figure 3B:
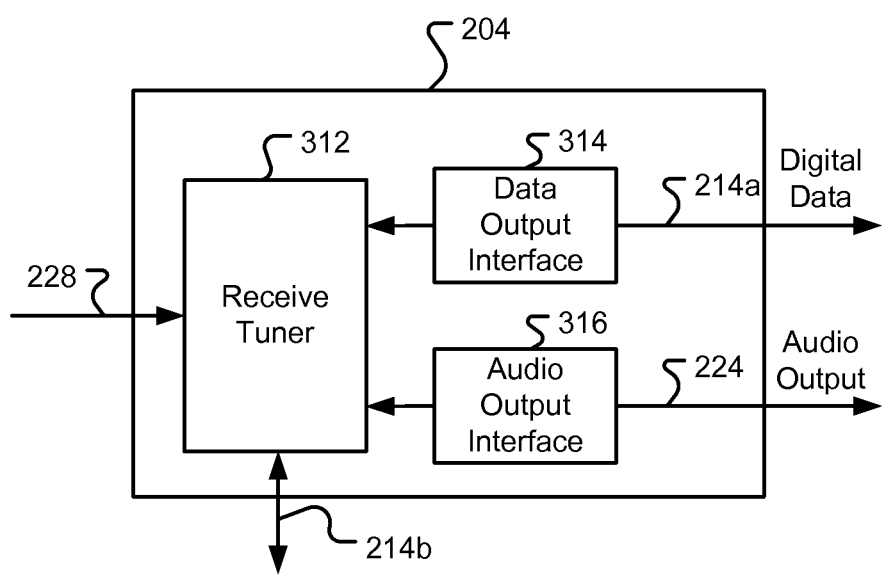
FIG. 3B illustrates a block diagram of an exemplary receiver for the duplex air audio system.

FIG. 3B illustrates a block diagram of an exemplary receiver 204 for the duplex air audio system. The receiver comprises a receive tuner 312, an audio output interface 316, and a data output interface 314, where the audio output interface 316 provides the audio signal received in the main channel of a receive channel as audio output through interface 224 and digital data received in the sub-channel of the receive channel as data output through interface 214a, which is a part of interface 214. The receive tuner 312 is responsible amplifying the received radio frequency signal using a low-noise amplifier (LNA), down-converting the amplified signal, demodulating and de-multiplexing to obtain audio and data output. In the receive path, signals at various stages may be subject to filtering to avoid interference. The receive tuner 312 interfaces with the controller 206 through interface 214b, which is a part of the interface 214. The controller 206 controls various operations of the receive tuner, such as the receive channel and filter parameters. The data output interface 314 provides digital data received at the sub-channel from interface 214a, which is part of the interface 214.

Figure 4A:
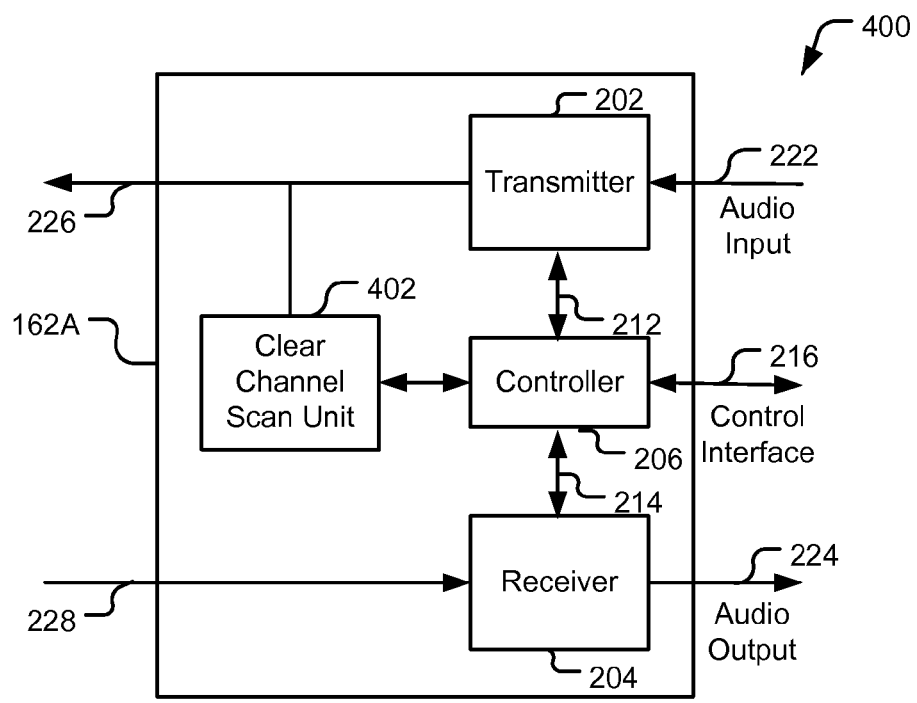
FIG. 4A illustrates a block diagram of an exemplary transceiver for the duplex air audio.

FIG. 4A illustrates a block diagram of an exemplary transceiver 162A including a clear channel scan unit 402 for the duplex air audio. The transceiver 162A is substantially the same as the transceiver 162 in FIGS. 2A and 2B except for the additional clear channel scan unit 402. As disclosed in U.S. Non-Provisional patent application Ser. No. 12/137,535, the clear channel scan unit 402 can quickly identify a channel un-occupied. While the clear channel scan unit 402 is shown to be coupled to the transmit antenna interface 226, it may also be coupled to the receive antenna interface 228. Furthermore, the clear channel scan unit 402 is shown as a unit separated from the transmitter 202 and the receiver 204, the clear channel scan unit 402 may be embedded in or share resources with the transmitter 202 or receiver 204 either completely or partially. The clear channel scan unit 402 as shown in FIG. 4A interfaces with the controller 206 for controlling the clear channel scan unit 402 or receiving information from the clear channel scan unit 402. Nevertheless, a dedicated controller may also be used to control or to receive data from the clear channel scan unit 402.

Figure 4B:
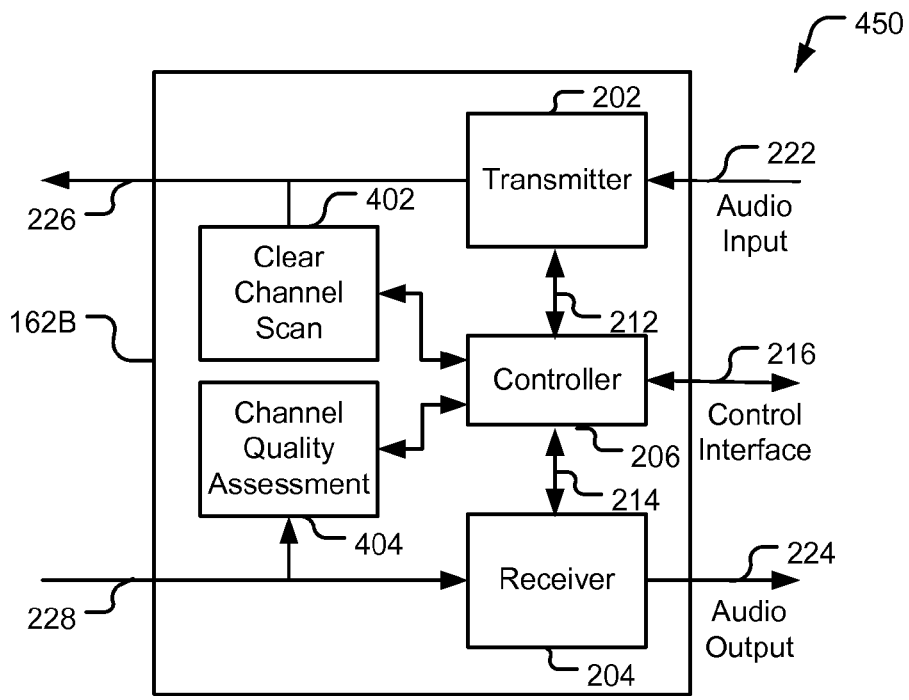
FIG. 4B illustrates a block diagram of an alternative transceiver for the duplex air audio.

FIG. 4B illustrates a block diagram of an alternative transceiver 162B including a clear channel scan unit 402 and a channel quality assessment unit 404 for the duplex air audio. The a channel quality assessment unit 404 is based on channel condition assessment technique as disclosed in U.S. Non-Provisional patent application Ser. No. 12/473,281, which can reliably assess the channel quality in terms of channel signal to noise ratio (SNR) instead of the conventional method solely based on the received signal strength. The channel quality assessment unit 404 as shown in FIG. 4B is a separate unit from the receiver 204. However, the channel quality assessment unit 404 may be embedded in or share resources with the receiver 204. The channel quality assessment unit 404 as shown in FIG. 4B interfaces with the controller 206 for controlling the channel quality assessment unit 404 or receiving information from the channel quality assessment unit 404. Nevertheless, a dedicated controller may also be used to control or to receive data from the channel quality assessment unit 404.

In a duplex wireless audio system, both sides may use the same type of transceiver as shown in FIG. 4A or FIG. 4B. In such case, the transceiver in each side is capable of determining a clear channel to transmit and such system is called a symmetrical system. While the transceiver in FIG. 4A and the transceiver in FIG. 4B include a clear channel scan unit 402, it is required for every transceiver in the system. If all the transceivers in a system are located in the same proximity, they may be subject to the same receiving environment. Therefore, as long as there is at least one transceiver equipped with the clear channel scan unit 402, the system may rely on this clear channel scan 402 to identify both transmit and receive channels for the system. In this case, the transceiver equipped with the clear channel scan unit 402 is designated as a master of the system and other transceivers are designated as slaves of the system. In the master-slave arrangement for the system shown in FIG. 2A and FIG. 2B, either the transceiver in the cellphone or the transceiver in the remote side can be used as the master.

Figure 5A:
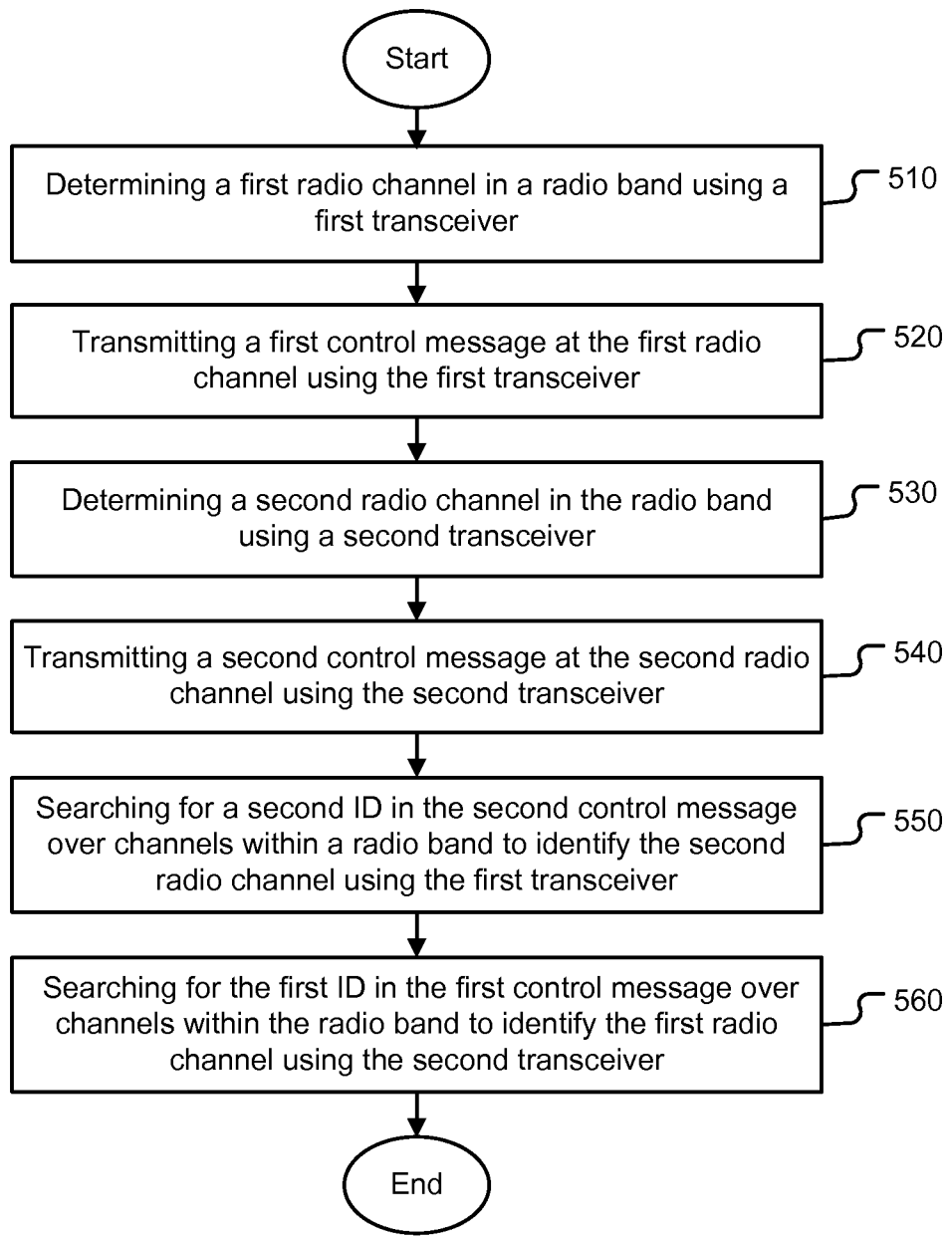
FIG. 5A illustrates an exemplary flow chart of a method of coordinating tuning between a pair of transceivers to establish duplex air audio based on a symmetrical protocol.
Figure 6A:
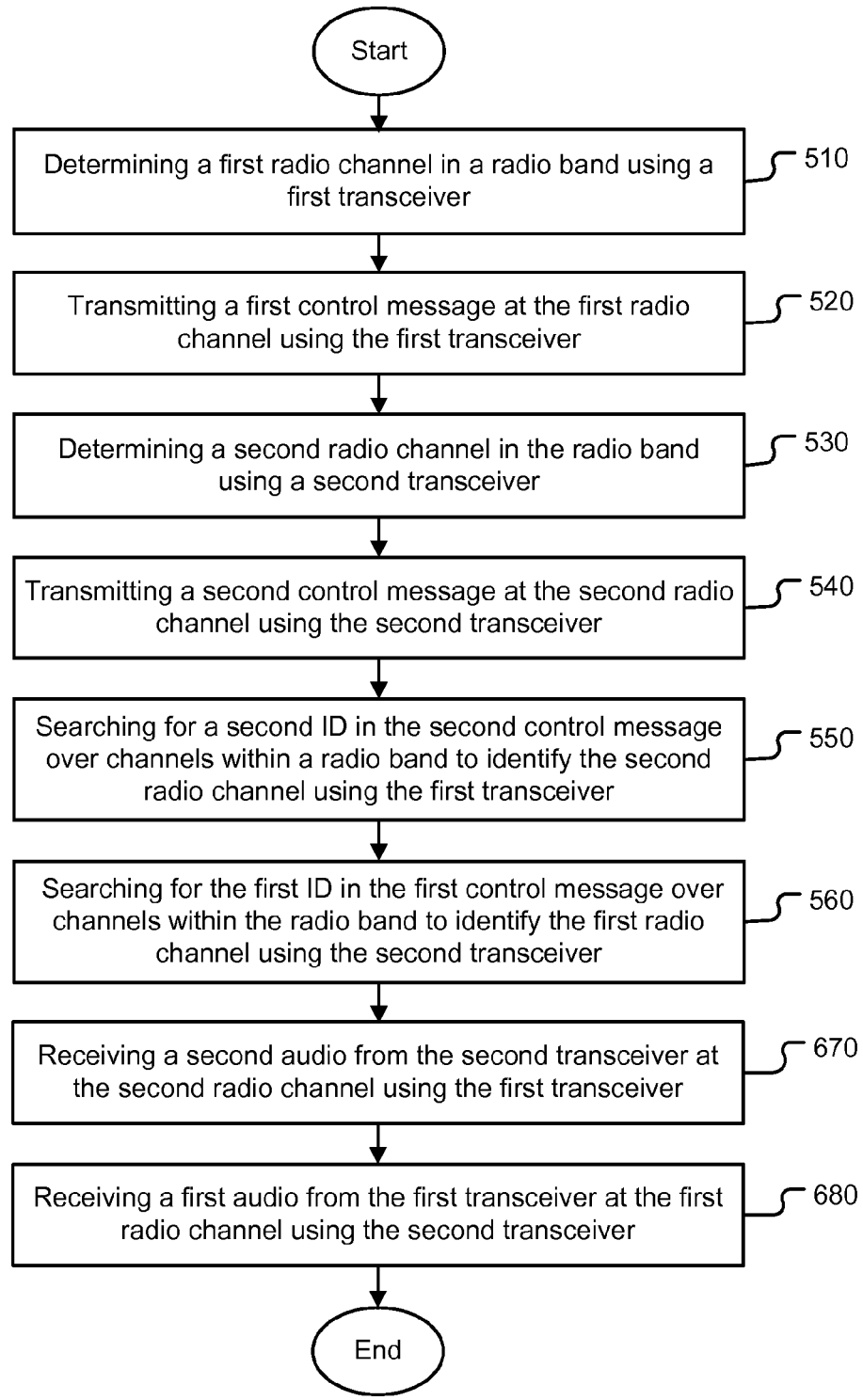
FIG. 6A illustrates an exemplary flow chart of a method of coordinating tuning between a pair of transceivers to establish duplex air audio and to receive the audio based on a symmetrical protocol.

FIG. 5A illustrates an exemplary flow chart of a method of coordinating tuning between a pair of transceivers to establish duplex air audio based on a symmetrical protocol. The method comprising: determining a first radio channel in a radio band 510; transmitting a first control message at the first radio channel using the first transceiver 520; determining a second radio channel in the radio band 530; transmitting a second control message at the second radio channel using the second transceiver 540; searching for a second ID in the second control message over channels within the radio band to identify the second radio channel using the first transceiver 550; and searching for a first ID in the first control message over channels within the radio band to identify the first radio channel using the second transceiver 560. Determining a first radio channel in a radio band and determining a second radio channel in the radio band can be based on the clear channel scan method. After the first radio channel and the second radio channel are established, the method further comprises receiving second audio from the second transceiver at the second radio channel using the first transceiver 670 and receiving first audio from the first transceiver at the first radio channel using the second transceiver 680, as shown in FIG. 6A. The first transceiver and the second transceiver may use the clear channel scan method to identify a clear channel and the two transceivers may incidentally start to identify an un-occupied channel at the same time. Likely the two transceivers may find the same clear channel and start to use the identified clear channel. If both transceivers include a channel quality assessment unit, the transceivers may find the channel quality is poor and causes the other transceiver to select to a new channel. Very likely, the two transceivers may find the same new channel again. In order to overcome this potential problem, a new channel search should be delayed by a small random time so that the two transceivers will not always start to search for a new channel at the same time.

Figure 5B:
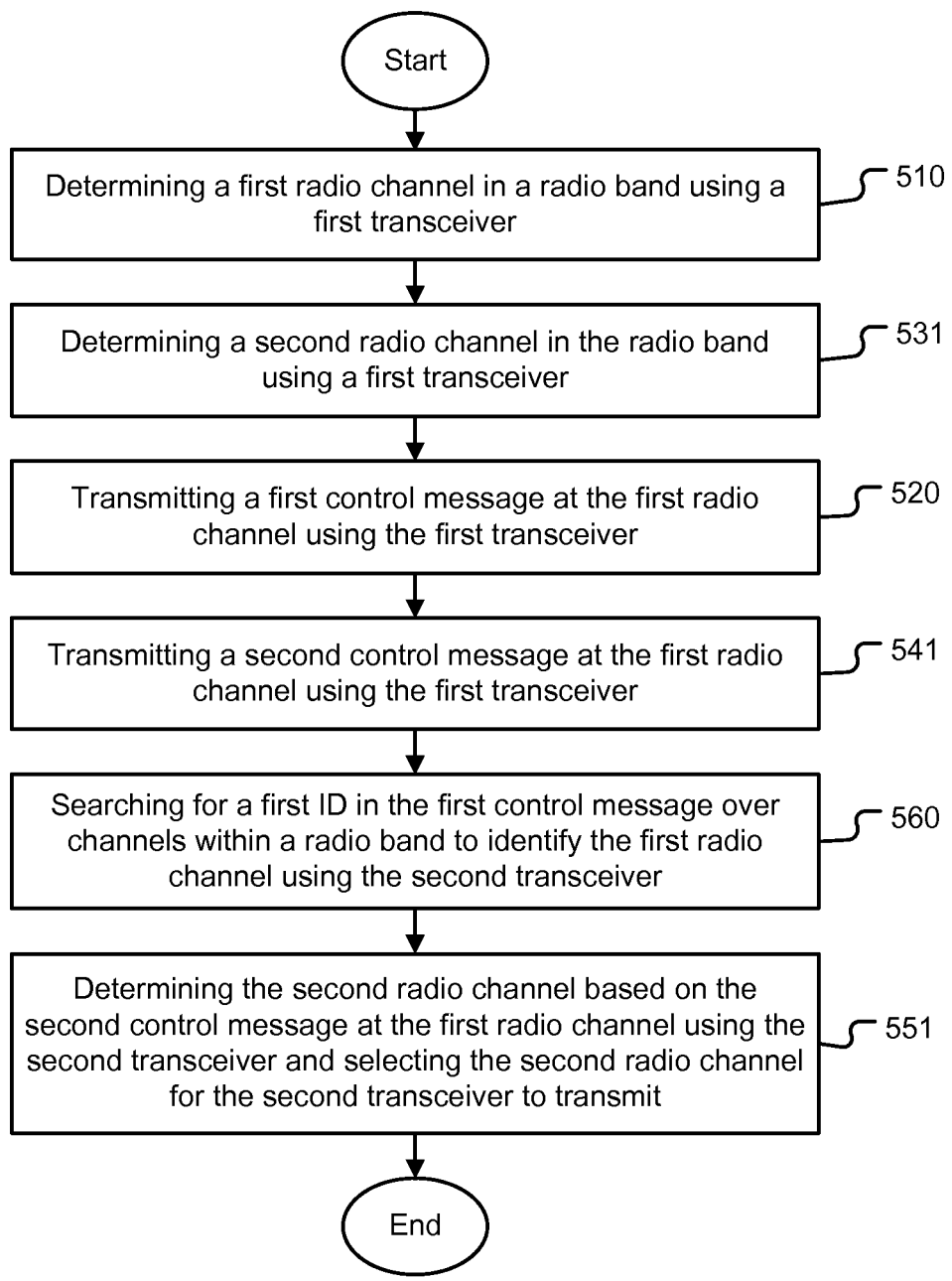
FIG. 5B illustrates an exemplary flow chart of a method of coordinating tuning between a pair of transceivers to establish duplex air audio based on a master-slave protocol.
Figure 6B:
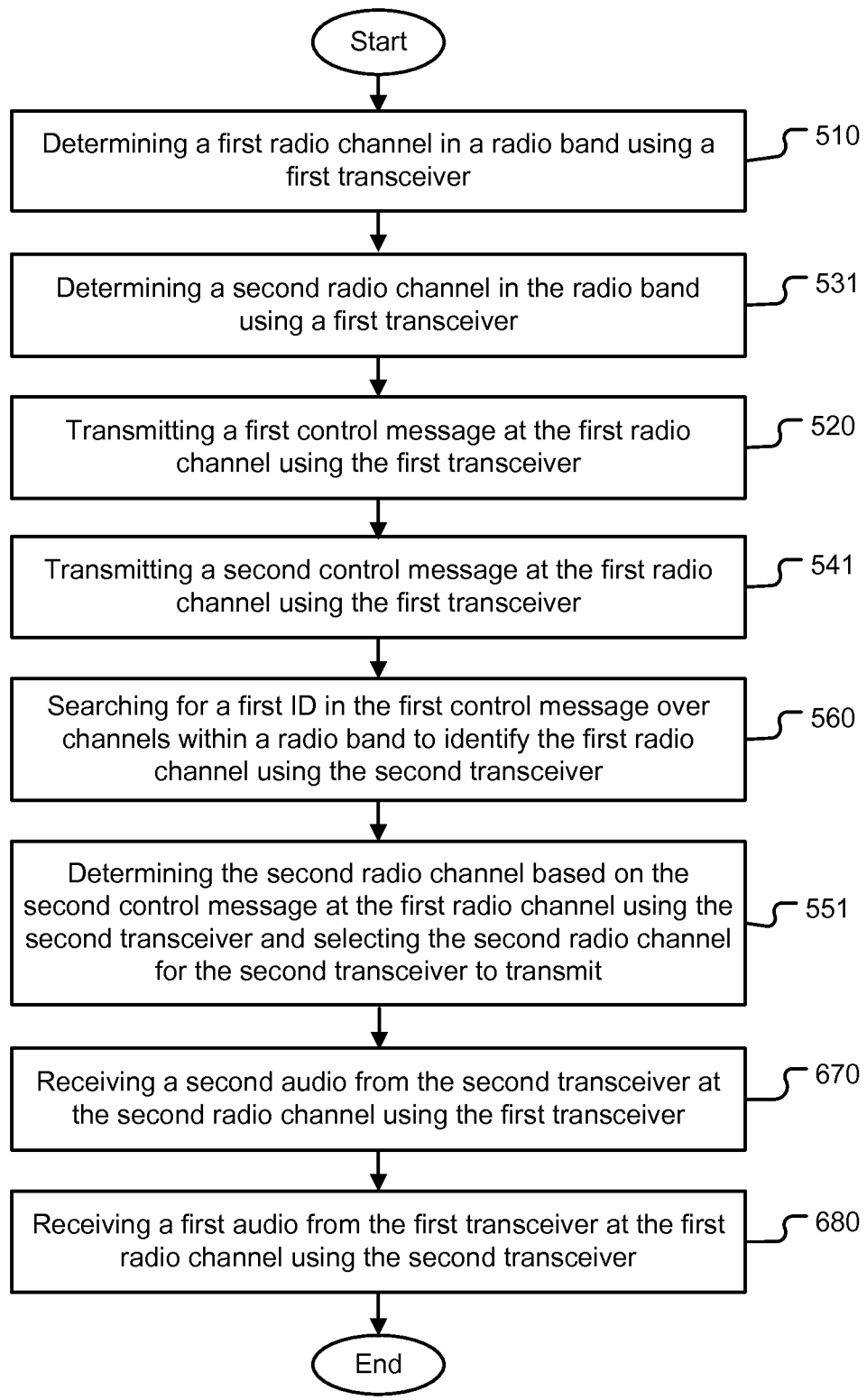
FIG. 6B illustrates an exemplary flow chart of a method of coordinating tuning between a pair of transceivers to establish duplex air audio and to receive the audio based on a master-slave protocol.

FIG. 5B illustrates an exemplary flow chart of a method of coordinating tuning between a pair of transceivers to establish duplex air audio based on a master-slave protocol. The first transceiver is used as the master and the second transceiver is used as the slave in this example. The first transceiver determines the first radio channel in step 510 and the second radio channel in step 531. The first transceiver then transmits information for identification in a first message at the first radio channel in step 520 and transmits a second message to provide information regarding the second channel at the first radio channel in step 541. On the slave side, the second transceiver searches for an ID in the received message through channels in the radio band to identify the first radio channel in step 560. When the first radio channel is identified, the second transceiver further receives the second message to identify the second radio channel in step 551. After the first radio channel and the second radio channel are established, the method further comprises receiving second audio from the second transceiver at the second radio channel using the first transceiver 670 and receiving first audio from the first transceiver at the first radio channel using the second transceiver 680, as shown in FIG. 6B.

Figure 7:
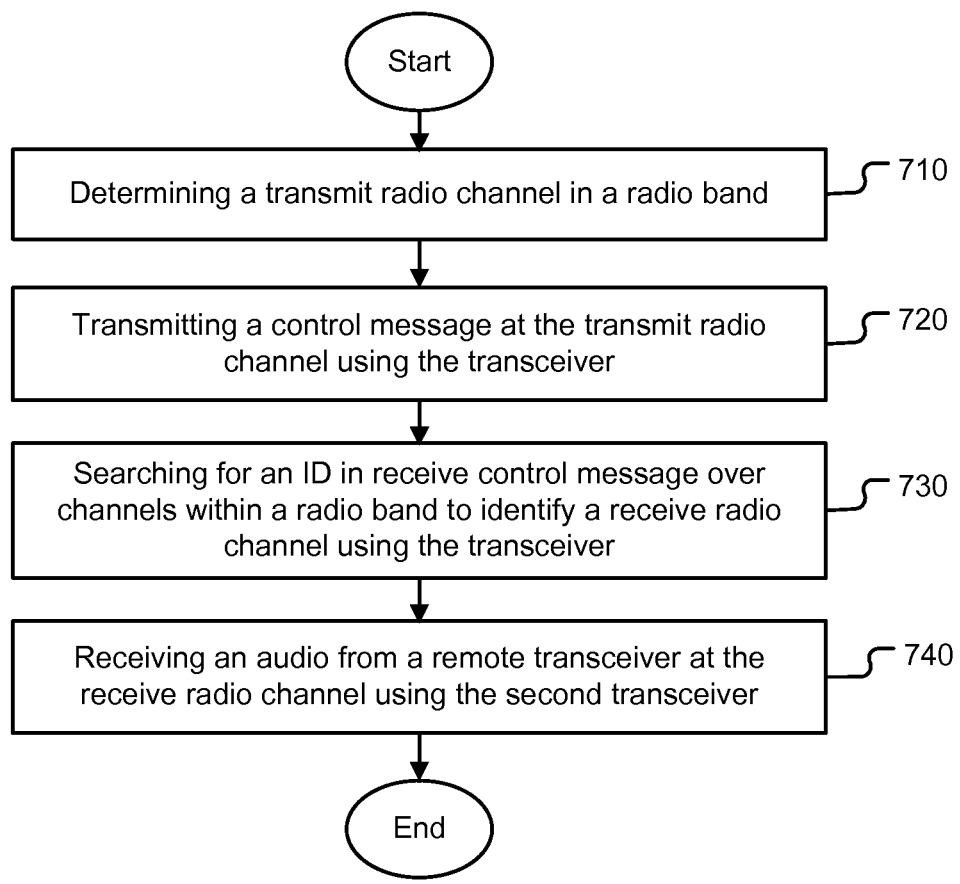
FIG. 7 illustrates an exemplary flow chart of a method of coordinating tuning for a transceiver to establish duplex air audio and to receive audio.

A method of coordinating tuning for a transceiver is also disclosed as shown in FIG. 7. In an embodiment of the present invention, the method comprises determining a transmit radio channel in a radio band 710; transmitting a transmit control message at the transmit radio channel using the transceiver 720; searching for an ID in a receive control message over channels within the radio band to identify a receive radio channel using the transceiver 730; and receiving audio from a remote transceiver at the receive radio channel using the transceiver 740. Determining a transmit radio channel in a radio band can be based on the clear channel scan method. Furthermore, the transceiver may start a new radio channel search after a random delay.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of coordinating tuning between a first transceiver and a second transceiver for duplex audio communication, the method comprising:
   determining a first radio channel in a radio band using the first transceiver;
   transmitting a first control message at the first radio channel using the first transceiver;
   determining a second radio channel in the radio band using the second transceiver;
   transmitting a second control message at the second radio channel using the second transceiver;
   searching for a second ID in the second control message over channels within the radio band to identify the second radio channel using the first transceiver; and searching for a first ID in the first control message over channels within the radio band to identify the first radio channel using the second transceiver.

2. The method of claim 1 further comprising:
receiving second audio from the second transceiver at the second radio channel using the first transceiver; and
receiving first audio from the first transceiver at the first radio channel using the second transceiver.

3. The method of claim 2 further comprising:
evaluating channel quality of the second radio channel using the first transceiver; and
transmitting a new first control message related to the quality of the second radio channel using the first transceiver.

4. The method of claim 3, wherein the new first control message causes the second transceiver to determine a new second radio channel.

5. The method of claim 2 further comprising:
evaluating channel quality of the first radio channel using the second transceiver; and
transmitting a new second control message related to the quality of the first radio channel using the second transceiver.

6. The method of claim 5, wherein the new second control message causes the first transceiver to determine a new first radio channel.

7. The method of claim 1, wherein determining a second radio channel in the radio band is based on a previously stored second radio channel.

8. The method of claim 1, wherein determining a first radio channel is based on a clear channel scan method.

9. The method of claim 8, wherein the clear channel scan method is started after a random delay.

10. The method of claim 1, wherein determining a second radio channel is based on a clear channel scan method.

11. The method of claim 10, wherein the clear channel scan method is started after a random delay.

12. The method of claim 11, wherein the first control message is transmitted in a sub-channel of the first radio channel and the second control message is transmitted in the sub-channel of the second radio channel.

13. The method of claim 1, wherein the radio band is an FM broadcast band.

14. The method of claim 1, wherein determining a first radio channel in a radio band is based on a previously stored first radio channel.

* * * * *